(12) United States Patent
Zou (10) Patent No.: US 12,287,057 B2
(45) Date of Patent: Apr. 29, 2025

(54) DUAL-SCREEN STAND FOR COMPUTER EXTENSION

(71) Applicant: Yeqiong Zou, Xinhua (CN)

(72) Inventor: Yeqiong Zou, Xinhua (CN)

( * ) Notice: Subject to any disclaimer, the term of this patent is extended or adjusted under 35 U.S.C. 154(b) by 0 days.

(21) Appl. No.: 18/829,634

(22) Filed: Sep. 10, 2024

(65) Prior Publication Data

US 2025/0003545 A1    Jan. 2, 2025

(30) Foreign Application Priority Data

Jun. 26, 2024   (CN) .......................... 202421479240.X (51) Int. Cl.
*F16M 11/38*     (2006.01)
*A47B 97/00*     (2006.01)
*F16M 11/04*     (2006.01)

(52) U.S. Cl.
CPC ........... *F16M 11/046* (2013.01); *A47B 97/00* (2013.01); *F16M 11/38* (2013.01); *A47B 2097/005* (2013.01); *F16M 2200/066* (2013.01)

(58) Field of Classification Search
CPC ............. A47B 2097/005; F16M 11/38; F16M 2200/066
USPC ........ 248/917, 918, 919, 121, 122.1, 123.11, 248/123.2, 124.1, 125.7
See application file for complete search history.

(56) References Cited

U.S. PATENT DOCUMENTS

| | | | | |
|---|---|---|---|---|
| 7,529,083 B2 * | 5/2009 | Jeong | ................... | F16M 11/105 600/407 |
| 8,282,052 B2 * | 10/2012 | Huang | ................... | F16M 11/24 248/125.1 |
| 8,550,415 B2 * | 10/2013 | Sculler | ................. | H05K 5/0204 248/495 |
| 9,532,461 B2 * | 12/2016 | Ishikawa | ............... | H05K 3/0008 |
| 10,180,209 B2 * | 1/2019 | Bowman | ................ | F16M 13/02 |
| 10,520,131 B2 * | 12/2019 | Burke | .................. | F16M 13/022 |
| 2005/0121594 A1 | 6/2005 | Kuo | | |
| 2010/0320339 A1 * | 12/2010 | Fan | ........................ | F16M 11/28 345/87 |
| 2011/0155868 A1 * | 6/2011 | Sun | ........................ | F16M 11/08 248/125.7 |
| 2012/0187257 A1 | 7/2012 | Zou | | |
| 2015/0282344 A1 * | 10/2015 | Ho | ........................ | F16M 11/045 248/125.7 |

(Continued)

*Primary Examiner* — Alfred J Wujciak
(74) *Attorney, Agent, or Firm* — Hemisphere Law, PLLC; Zhigang Ma (57) ABSTRACT

The present disclosure discloses a dual-screen base support for computer extension, including: a mounting plate, wherein one side of the mounting plate is movably connected with a first connection shaft; a connection plate is mounted on the first connection shaft; one side of the connection plate is movably connected with a second connection shaft; a first mounting socket is mounted on the second connection shaft; the other side of the mounting plate is movably connected with a sliding plate; a front end of the sliding plate is movably connected with a third connection shaft; a second mounting socket is mounted on the third connection shaft. According to dual-screen base support for computer extension, an extended screen is arranged on an external structure, thus avoiding application of pressure to a screen of a notebook computer. Furthermore, when not in use, the extended screen can be quickly folded, which facilitates transportation.

5 Claims, 7 Drawing Sheets

(56) References Cited

U.S. PATENT DOCUMENTS

2015/0305481 A1    10/2015  Mick et al.
2020/0000430 A1*    1/2020  Chamberlain ......... A61B 8/467

* cited by examiner

DUAL-SCREEN STAND FOR COMPUTER EXTENSION

TECHNICAL FIELD

The present disclosure relates to the technical field of notebook computers, and specifically, to a dual-screen stand for computer extension.

BACKGROUND

As an office tool, notebook computers often have small screens due to their portability. Therefore, it is necessary to mount an extended screen to enlarge a display range. Extension of a screen to a notebook computer can be achieved in various ways, including using a USB-C (Type-C), a Display Port (DP), a High-Definition Multimedia Interface (HDMI), a Thunderbolt 3/4, and other interfaces. These interfaces not only support display output, but also support charging and extension functions. An extended screen needs to be fixed with a support during mounting.

However, an existing notebook computer and screen connection support is often directly mounted on a display screen of a notebook computer, and the weight of the extended screen will apply a high pressure to the screen of the notebook computer. Furthermore, the volume is large, which is not convenient for transportation.

SUMMARY

The present disclosure aims to provide a dual-screen stand for computer extension. An extended screen is arranged on an external structure, thus avoiding application of pressure to a screen of a notebook computer. Furthermore, when not in use, the extended screen can be quickly folded, which facilitates transportation. The problems mentioned in the background are solved.

To achieve the above objectives, the present disclosure provides the following technical solution: A dual-screen stand for computer extension includes: a mounting plate, wherein one side of the mounting plate is movably connected with a first connection shaft; a connection plate is mounted on the first connection shaft; one side of the connection plate is movably connected with a second connection shaft; a first mounting socket is mounted on the second connection shaft; the other side of the mounting plate is movably connected with a sliding plate; a front end of the sliding plate is movably connected with a third connection shaft; a second mounting socket is mounted on the third connection shaft; and the first mounting socket and the second mounting socket are respectively detachably connected with two display screens.

The mounting plate is configured to mount the first connection shaft, provide a track for a sliding plate to slide, and mount a sliding block. The first connection shaft is configured to connect the mounting plate to a connection plate, so that the connection plate can rotate on the mounting plate. The connection plate is configured to mount the second connection shaft. The second connection shaft is configured to connect the connection plate to the first mounting socket, so that the first mounting socket can rotate on the connection plate. The first mounting socket is configured to be plugged into the mounting slot and mount a display screen. The sliding plate is configured to slide on the mounting plate and mount the third connection shaft. The third connection shaft is configured to connect the sliding plate to the second mounting socket. The second mounting socket is configured to be plugged into the mounting slot and mount the display screen. The display screen is used as a notebook computer extended screen.

Preferably, a mounting sliding block is mounted in the middle of a rear end of the mounting plate; a vertical column is arranged at a rear end of the mounting sliding plate; a through sliding chute is provided on the vertical column; and the mounting sliding block is movably connected in the sliding chute. The mounting sliding block is configured to mount the mounting plate and slide in the sliding chute, so that the mounting plate slides up and down. The sliding chute is configured to provide a channel where the mounting sliding block slides. The vertical column is configured to provide the sliding chute and mount an adjustment shaft.

Preferably, a bottom end of the vertical column is movably connected with an adjustment shaft, and the adjustment shaft is connected with a mounting seat. The adjustment shaft is configured to connect the vertical column to the mounting seat, so that the vertical column can rotate on the mounting seat. The mounting seat is configured to mount the adjustment shaft.

Preferably, a bottom plate is mounted at a bottom end of the mounting seat, and a cut hole is provided on the bottom plate. The bottom plate is configured to place a notebook computer and stabilize the mounting seat. The cut hole is configured to provide a heat dissipation function.

Preferably, mounting slots are provided on two sides of rear parts and bottom ends of the display screens, and the two display screens are vertically mounted on the first mounting socket and the second mounting socket through the mounting slots at the bottom ends. The mounting slots are configured to plug the first mounting socket and the second mounting socket, thereby mounting the display screen.

Preferably, a first buckle block is mounted on one side of the first mounting socket; a second buckle block is mounted on one side of the second mounting socket; buckle slots are provided on the mounting slots; and the first buckle block and the second buckle block are respectively connected with the two buckle slots. The first buckle block and the second buckle block are both configured to be clamped in the buckle slots; and the buckle slots are configured to fix the first buckle block and the third buckle block, thereby connecting the mounting slots to the first mounting socket and the second mounting socket.

Preferably, heat dissipation fans are mounted on two sides of the bottom plate. The heat dissipation fans are configured to actively dissipate heat of a notebook computer.

Compared with the prior art, the present disclosure has the beneficial effects below:

Two display screens are respectively plugged into the first mounting socket and the second mounting socket, thereby mounting the two display screens. When the display screens and the device need to be folded, the sliding plate is pulled to slide on the mounting plate, thus driving the second mounting socket to be folded; the second mounting socket drives the display screen on one side to be folded; and the first mounting socket is then pulled to rotate on the second connection shaft, so that the second mounting socket drives the display screen on the other side to be folded, thereby completing the folding.

According to dual-screen stand for computer extension, an extended screen is arranged on an external structure, thus avoiding application of pressure to a screen of a notebook computer. Furthermore, when not in use, the extended screen can be quickly folded, which facilitates transportation.

Reference numerals and names in the accompanying drawings are as follows:

100: mounting plate; 110: mounting sliding block; 120: vertical column; 121: sliding chute; 130: adjustment shaft; 140: mounting seat; 150: bottom plate; 151: cut hole; 160: heat dissipation fan; 200: first connection shaft; 210: connection plate; 220: second connection shaft; 230: first mounting socket; 240: first buckle block; 300: sliding plate; 310: third connection shaft; 320: second mounting socket; 330: second buckle block; 400: display screen; 410: mounting slot; and 420: buckle slot.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are merely some embodiments of the present disclosure, rather than all of the embodiments. All other embodiments obtained by a person of ordinary skill in the art based on the embodiments of the present disclosure without making creative efforts shall fall within the protection scope of the present disclosure.

Embodiment I

Referring to FIG. 1 to FIG. 6, the present disclosure provides an embodiment: A dual-screen stand for computer extension includes a mounting plate 100; one side of the mounting plate 100 is rotatably connected with a first connection shaft 200; a connection plate 210 is connected to the first connection shaft 200 through a bolt; one side of the connection plate 210 is rotatably connected with a second connection shaft 220; a first mounting socket 230 is connected to the second connection shaft 220 through a bolt; the other side of the mounting plate (100) is slidably connected with a sliding plate 300; a front end of the sliding plate 300 is rotatably connected with a third connection shaft 310; a second mounting socket 320 is connected to the third connection shaft 310 through a bolt; and the first mounting socket 230 and the second mounting socket 320 are respectively detachably connected with two display screens 400.

During specific use, the two display screens 400 are respectively plugged into the first mounting socket 230 and the second mounting socket 320, thereby mounting the two display screens 400. When the display screens 400 and the device need to be folded, the sliding plate 300 is pulled to slide on the mounting plate 100, thus driving the second mounting socket 320 to be folded; the second mounting socket 320 drives the display screen 400 on one side to be folded; and the first mounting socket 230 is then pulled to rotate on the second connection shaft 220, so that the second mounting socket 320 drives the display screen 400 on the other side to be folded, thereby completing the folding.

Figure 2:
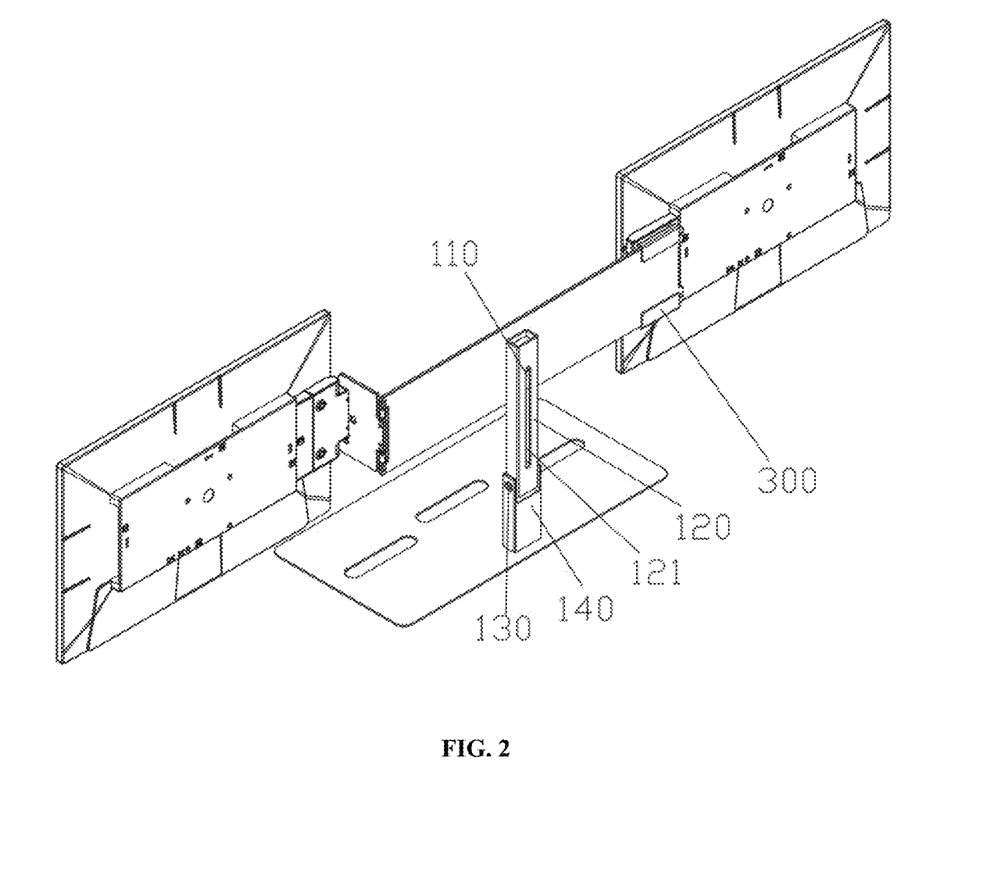
FIG. 2 is a schematic structural diagram of a rear view of the present disclosure.
Figure 3:
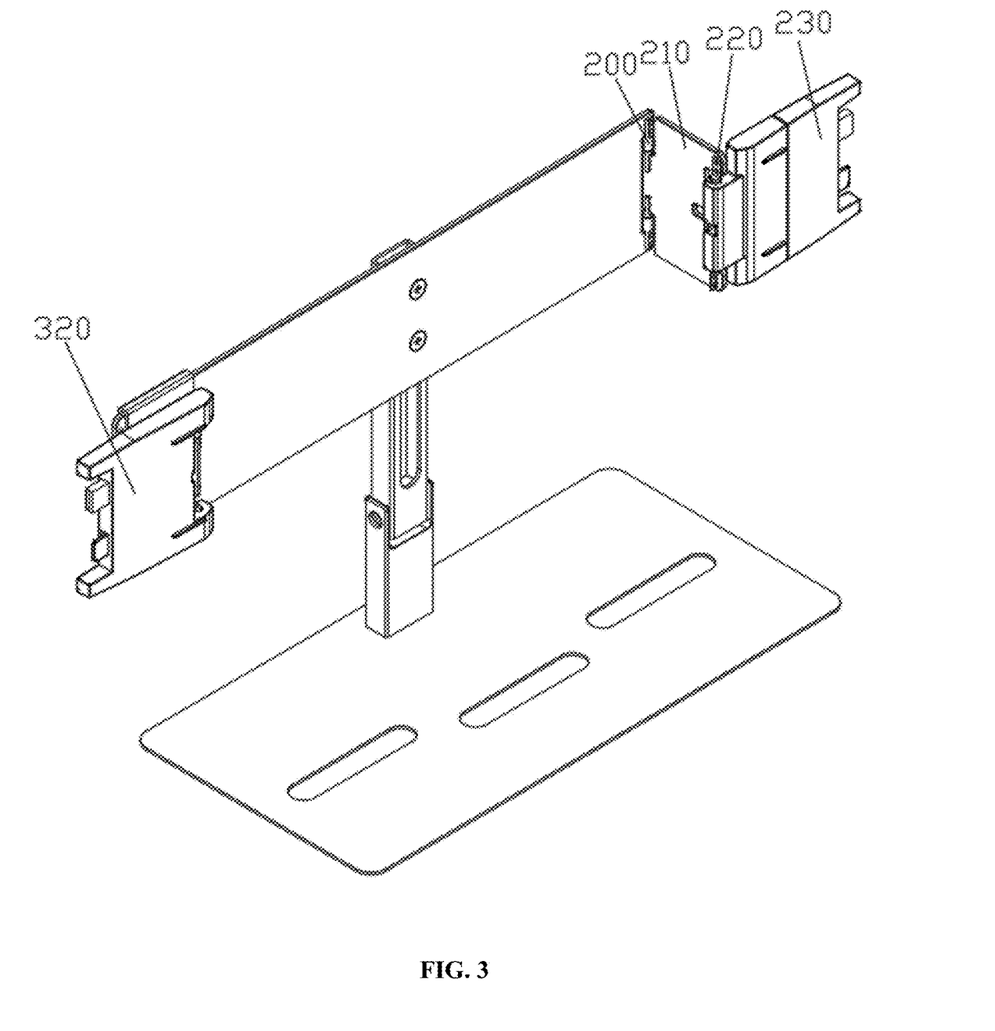
FIG. 3 is a schematic structural diagram of a front view after a display screen is removed in the present disclosure.
Figure 4:
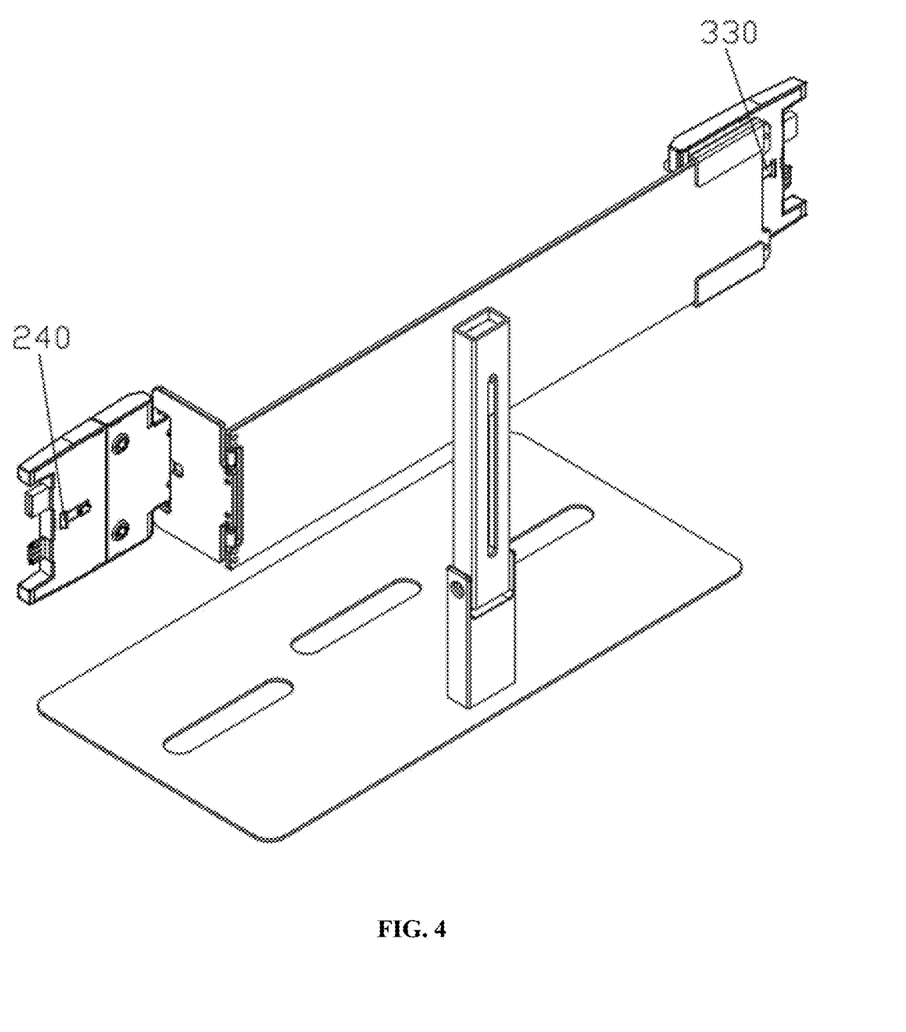
FIG. 4 is a schematic structural diagram of a rear view after a display screen is removed in the present disclosure.

A mounting sliding block 110 is mounted in the middle of a rear end of the mounting plate 100; a vertical column 120 is arranged at a rear end of the mounting sliding plate 110; a through sliding chute 121 is provided on the vertical column 120; and the mounting sliding block 110 is slidably connected in the sliding chute 121. The mounting plate 100 is pulled, and drives the mounting sliding block 110 to slide on the vertical column 120 along the sliding chute 121, so that the mounting plate 100 can slide along the vertical column 120.

A bottom end of the vertical column 120 is rotatably connected with an adjustment shaft 130, and the adjustment shaft 130 is connected with a mounting seat 140 in an embedded manner. The vertical column 120 is then pulled to rotate on the mounting seat 140 through the adjustment shaft 130. An angle of the vertical column is adjusted, thereby adjusting front-back angles of the display screens 400.

Figure 1:
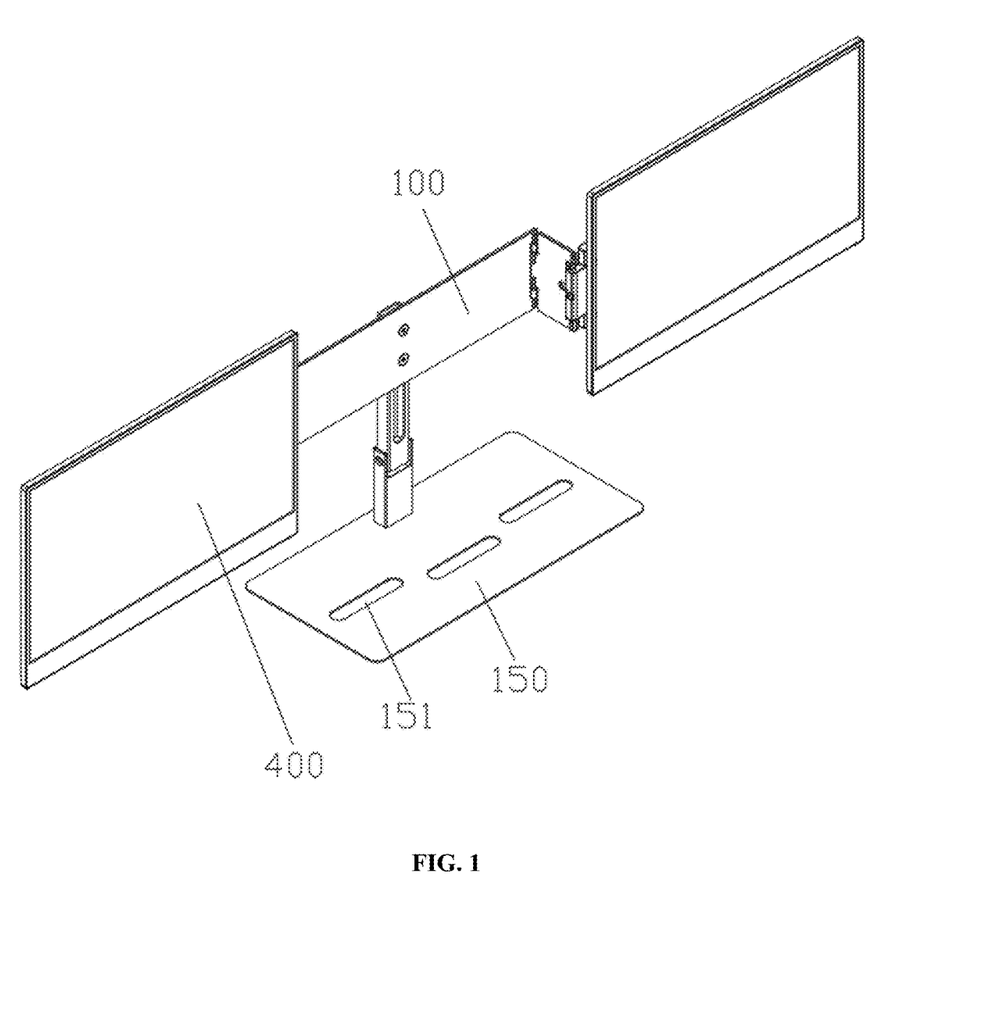
FIG. 1 is a schematic structural diagram of a front view of the present disclosure.

A bottom plate 150 is mounted at a bottom end of the mounting seat 140 through a bolt, and a cut hole 151 is provided on the bottom plate 150. The bottom plate 150 supports the mounting seat 140, and the cut hole 151 provides a heat dissipation function for a notebook computer on the bottom plate 150.

Figure 6:
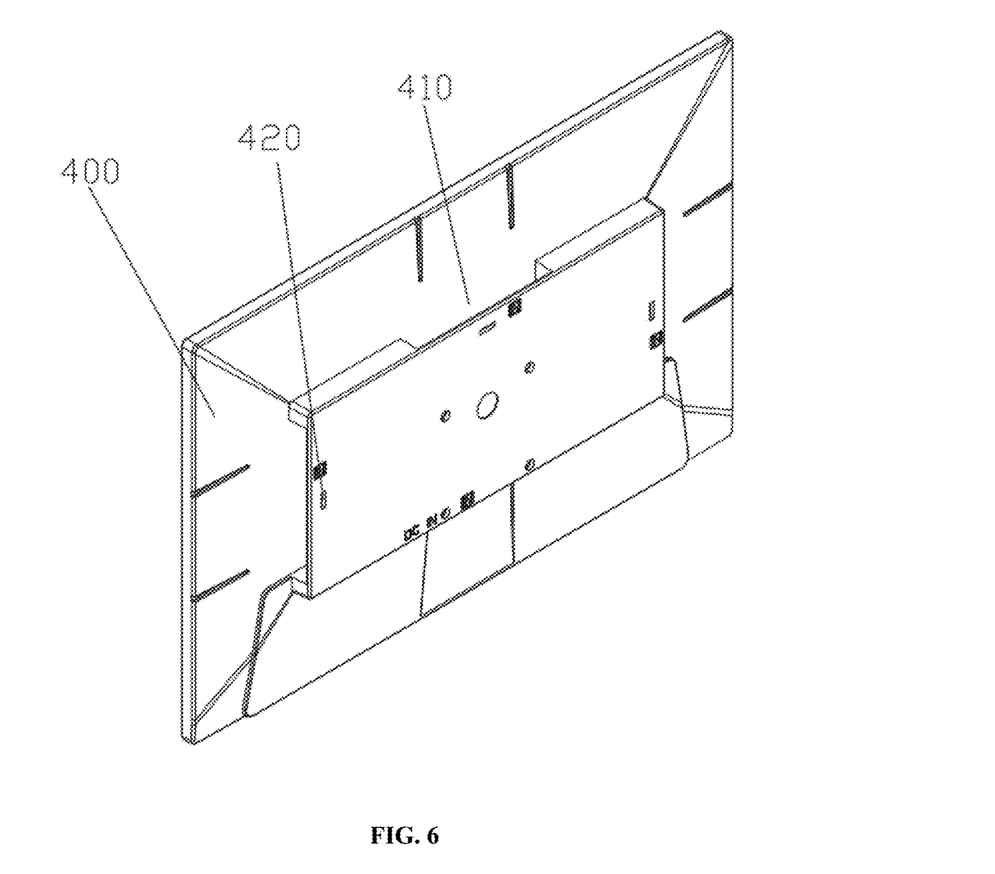
FIG. 6 is a schematic structural diagram of a display screen in the present disclosure.

Mounting slots 410 are provided on two sides of rear parts and bottom ends of the display screens 400, and the two display screens 400 are vertically mounted on the first mounting socket 230 and the second mounting socket 320 through the mounting slots 410 at the bottom ends. Due to the mounting slots 410 provided at the bottom ends of the display screens 400, the display screens 400 can be vertically mounted on the first mounting socket 230 and the second mounting socket 320.

Figure 5:
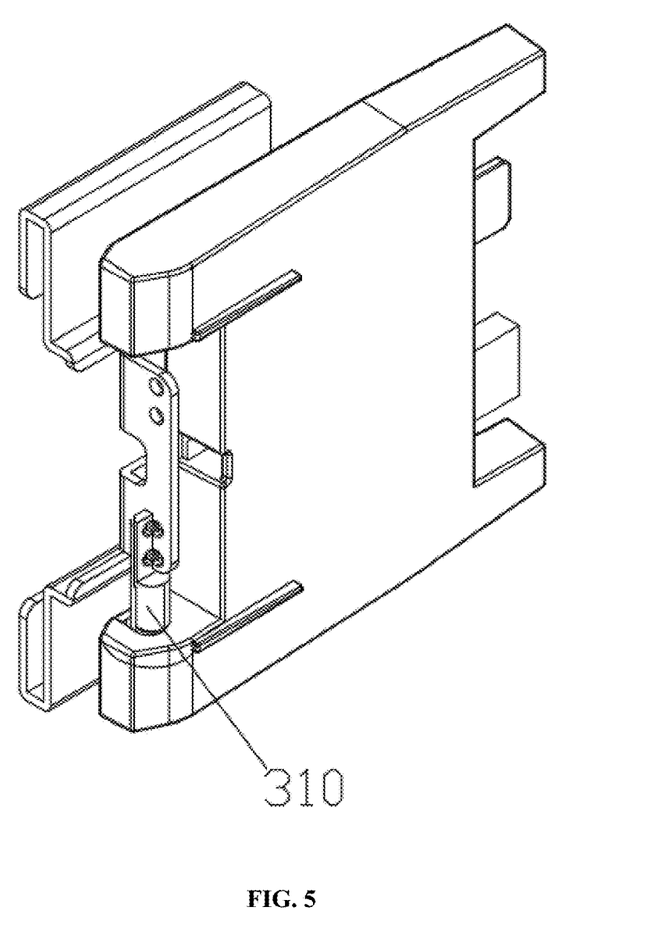
FIG. 5 is a schematic structural diagram of a second mounting socket of the present disclosure.

A first buckle block 240 is integrally formed on one side of the first mounting socket 230, and a second buckle block 320 is integrally formed on one side of the second mounting socket 320. Buckle slots 420 are provided on the mounting slots 410. The first buckle block 240 and the second buckle block 320 are respectively buckled to the two buckle slots 420. The first mounting socket 230 is plugged into one mounting slot 410, and the first buckle block 240 is buckled on the buckle slot 420, so that the first mounting socket 230 is connected to the mounting slot 410, and the second mounting socket 320 is plugged into the other mounting slot 410.

Embodiment II

Figure 7:
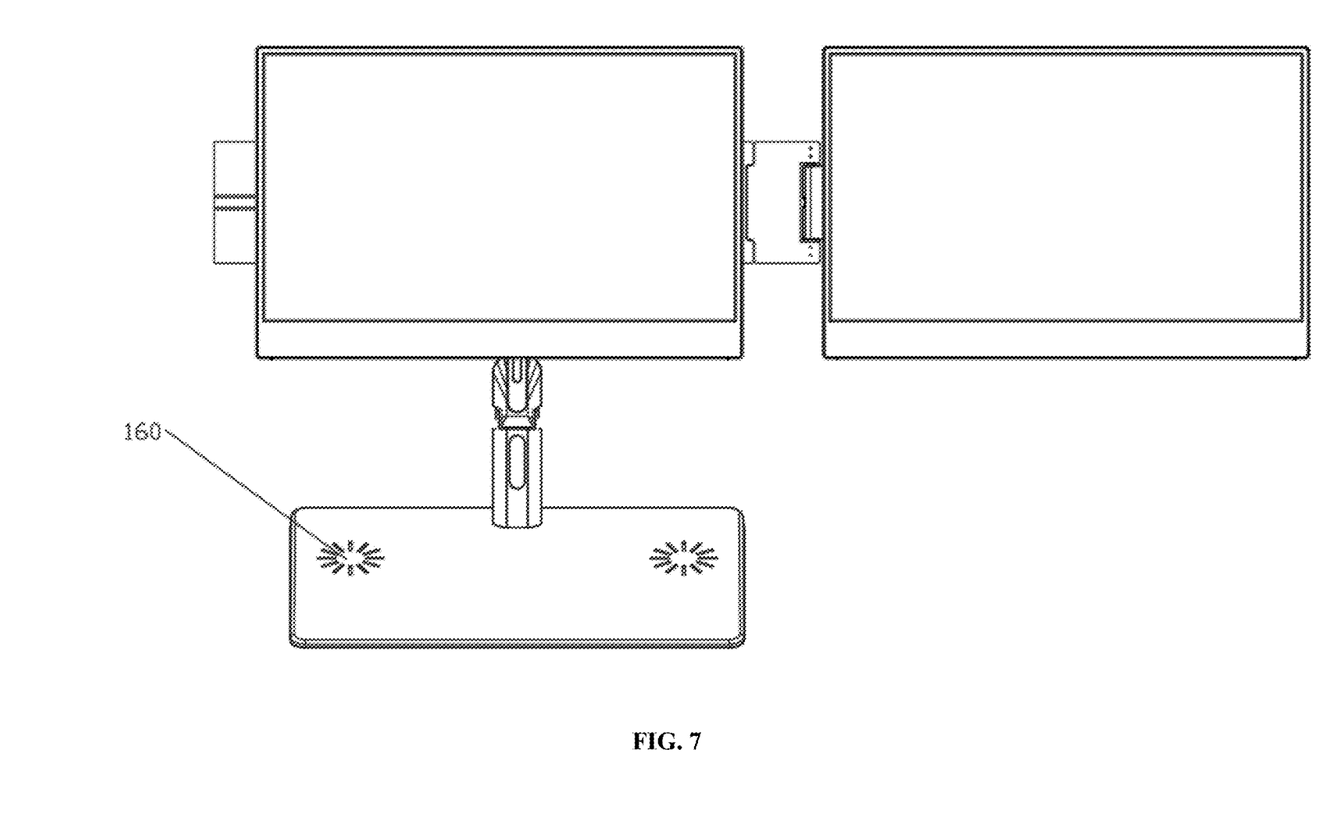
FIG. 7 is a schematic structural diagram of mounting a heat dissipation fan on a bottom plate of the present disclosure.

Referring to FIG. 7, the present disclosure provides another embodiment, which is basically the same as Embodiment I, and a difference is that heat dissipation fans 160 are mounted on two sides of the bottom plate 150. A notebook computer placed on the bottom plate 150 is cooled through the heat dissipation fans 160. All parts that are not explained in this embodiment are found in Embodiment I, and will not be elaborated here.

For those skilled in the art, it is apparent that the present disclosure is not limited to the details of the exemplary embodiments mentioned above, and can be implemented in other specific forms without departing from the spirit or basic features of the present disclosure. Therefore, in any perspective, the embodiments should be regarded as exem-

What is claimed is:

1. A dual-screen stand for computer extension, comprising: a mounting plate (100), wherein one side of the mounting plate (100) is movably connected with a first connection shaft (200); a connection plate (210) is mounted on the first connection shaft (200); one side of the connection plate (210) is movably connected with a second connection shaft (220); a first mounting socket (230) is mounted on the second connection shaft (220); the other side of the mounting plate (100) is movably connected with a sliding plate (300); a front end of the sliding plate (300) is movably connected with a third connection shaft (310); a second mounting socket (320) is mounted on the third connection shaft (310); and the first mounting socket (230) and the second mounting socket (320) are respectively detachably connected with two display screens (400);

wherein mounting slots (410) are provided on two sides of rear parts and bottom ends of the display screens (400), and the two display screens (400) are vertically mounted on the first mounting socket (230) and the second mounting socket (320) through the mounting slots (410) at the bottom ends;

wherein a first buckle block (240) is mounted on one side of the first mounting socket (230); a second buckle block (330) is mounted on one side of the second mounting socket (320); buckle slots (420s) are provided on the mounting slots (410); and the first buckle block (240) and the second buckle block (330) are respectively connected with the two buckle slots (420).

2. The dual-screen stand for computer extension according to claim 1, wherein a mounting sliding block (110) is mounted in the middle of a rear end of the mounting plate (100); a vertical column (120) is arranged at a rear end of the mounting sliding plate (110); a through sliding chute (121) is provided on the vertical column (120); and the mounting sliding block (110) is movably connected in the sliding chute (121).

3. The dual-screen stand for computer extension according to claim 2, wherein a bottom end of the vertical column (120) is movably connected with an adjustment shaft (130), and the adjustment shaft (130) is connected with a mounting seat (140).

4. The dual-screen stand for computer extension according to claim 3, wherein a bottom plate (150) is mounted at a bottom end of the mounting seat (140), and a cut hole (151) is provided on the bottom plate (150).

5. The dual-screen stand for computer extension according to claim 4, wherein heat dissipation fans (160) are mounted on two sides of the bottom plate (150).

* * * * *